W. J. BARKER.
UNIVERSAL JOINT.
APPLICATION FILED AUG. 26, 1915.
1,193,499.
Patented Aug. 8, 1916.
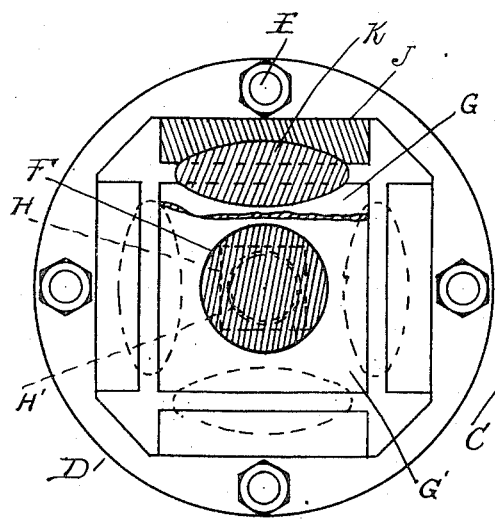
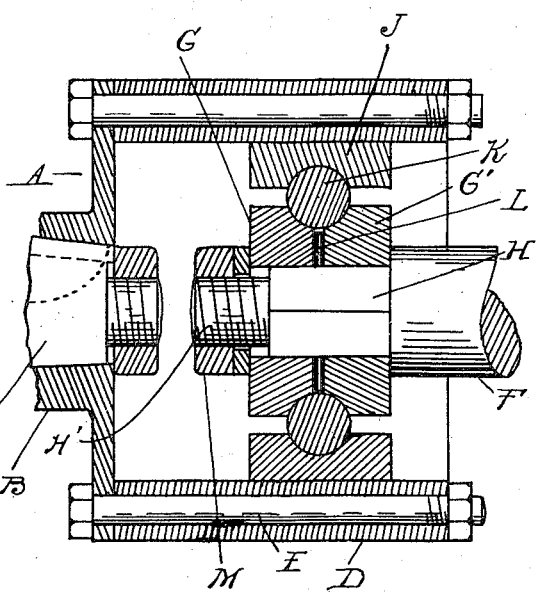
Inventor
William J. Barker
By Whittemore Hulbert & Whittemore
Attorneys

UNITED STATES PATENT OFFICE.

WILLIAM J. BARKER, OF PONTIAC, MICHIGAN.

UNIVERSAL JOINT.

1,193,499.   Specification of Letters Patent.   Patented Aug. 8, 1916.

Application filed August 26, 1915. Serial No. 47,403.

*To all whom it may concern:*

Be it known that I, WILLIAM J. BARKER, a citizen of the United States of America, residing at Pontiac, in the county of Oakland and State of Michigan, have invented certain new and useful Improvements in Universal Joints, of which the following is a specification, reference being had therein to the accompanying drawings.

The invention relates to universal joints for power transmission shafts, such for instance as the propeller shafts of automobiles.

It is the object of the invention to obtain a simple and easily assembled construction as hereinafter set forth.

In the drawings: Figure 1 is a longitudinal section through the joint; and Fig. 2 is a sectional end elevation thereof.

A is a head having a tapering socket B mounted upon one of the shafts C.

D is a hollow member having a polygonal recess, secured to or formed integral with the member A, and as shown being attached by bolts E.

F is the coöperating shaft which has mounted thereon the polygonal members G and G', having faces arranged parallel to the faces of the polygonal recessed member D. These members G and G' are preferably mounted on a reduced end portion H of the shaft F, which is polygonal or otherwise formed to non-rotatively engage said members G and G'.

J are blocks arranged opposite the members G and G' and bearing against the parallel faces of the member D.

K are pivotal or roller members arranged between the members G G' and blocks J, and engaging recesses formed therein. The pivotal or roller members K are preferably of ovoidal form, being of maximum diameter at the center and tapering toward their opposite ends. The recesses in the blocks J and members G and G' are of similar form, and thus when the parts are assembled the torque will be transmitted from one shaft to the other through the medium thereof. At the same time any angular movement of one shaft in relation to the other is permitted by a rotation of the blocks J upon the rolls K.

For taking up the wear on the rolls, the blocks G and G' may be adjusted toward each other. To provide for this, shims L are placed between the adjacent faces of said members, and a clamping nut M engaging the threaded end H' of the portion H serves to draw said members together. In case of wear one or more of the shims may be removed, which will adjust the members G and G' toward each other to take up said wear.

The construction described can be easily manufactured, quickly assembled, and in operation will be efficient in transmitting the torque with perfect freedom of angular movement in the shafts. The oval shape of the rolls distributes the stresses so that the load is not concentrated upon any one point. Also the oscillatory movement due to the relation of the shafts will maintain the lubrication upon the rolls and will avoid cutting or grinding of the same.

What I claim as my invention is:—

1. A universal joint, comprising a drive and a driven shaft, a polygonal socket member secured to the one, a polygonal member secured to the other within said socket, slidable blocks engaging the polygonal faces of said socket member, and ovoidal rolls between said blocks and inner polygonal member on the shaft engaging corresponding recesses formed therein.

2. A universal joint, comprising drive and driven shafts, a polygonal socket member secured to one, a polygonal member upon the other within said socket, slidable blocks engaging the polygonal faces of said socket member, ovoidal rolls between said blocks and inner polygonal member engaging corresponding recesses therein, and means for adjusting one of said members to compensate for wear.

3. A universal joint, comprising drive and driven shafts, a polygonal socket member secured to the one, a polygonal member secured to the other within said socket member, said inner polygonal member being formed of a plurality of sections relatively adjustable longitudinally of said shaft, blocks slidably engaging the polygonal faces of said socket member, and ovoidal rolls between said blocks and inner polygonal member engaging recesses therein, the adjustment between the sections of said inner polygonal member compensating for wear.

4. A universal joint, comprising drive and driven shafts, a polygonal socket member secured to one, a polygonal member secured to the other within said socket member, said member being formed of a plurality of sections relatively adjustable longitudinally of said shaft, shims between said sections, a nut engaging a threaded portion of said shaft for clamping said sections against said shims, blocks slidably engaging the polygonal faces of said socket member, and ovoidal rolls engaging recesses in said blocks and the sections of said inner polygonal member, and forming a means of transmitting the torque from the one to the other.

5. A universal joint, comprising a drive and a driven shaft, a polygonal socket member secured to the one, a polygonal member secured to the other within said socket, pivotal members intermediate said polygonal members, and means for adjusting one of said polygonal members to compensate for wear.

6. A universal joint, comprising a drive and a driven shaft, a polygonal socket member secured to the one, a polygonal member secured to the other within said socket, said inner polygonal member comprising a plurality of sections relatively adjustable longitudinally of said shaft, slidable blocks engaging the polygonal faces of said socket member, pivotal members between said blocks and inner polygonal member engaging corresponding recesses formed therein, and means for adjusting said sections.

In testimony whereof I affix my signature in presence of two witnesses.

WILLIAM J. BARKER.

Witnesses:
J. A. TILLSON,
BESSIE GILLOE.